3,349,109
PROCESS FOR PRODUCING DIORGANOTIN
S,O-MERCAPTOCARBOXYLATES
Alfred A. Lach, Perth Amboy, N.J., assignor to M & T Chemicals Inc., New York, N.Y., a corporation of Delaware
No Drawing. Filed Dec. 16, 1964, Ser. No. 418,880
14 Claims. (Cl. 260—429.7)

This invention relates to a novel process for preparing organotin compounds.

Diorganotin derivatives of mercaptoacids, e.g. diorganotin S,O-mercaptocarboxylates such as di-n-butyltin S,O-$\beta$-mercaptopropionate are useful compounds which have found considerable acceptance in commercial practice, for example as stabilizers for halogenated resins. The fullest potential of these compounds has not been realized, however, because of the lack of a convenient, simple, and inexpensive process for their preparation.

These compounds have heretofore been prepared by the reaction of a diorganotin oxide with a mercaptoacid. It has heretofore been believed that preparation of these compounds in pure form could only be carried out by using high purity mercaptoacid to eliminate undesirable by-products (which would be obtained if impure acid were used) which may undesirably dilute the desired product, degrade its performance as a stabilizer, introduce off-colors, cause staining, waste starting material, etc. and which may be difficult or impossible to separate from the desired product.

It is an object of this invention to provide a novel process for preparing diorganotin mercaptocarboxylates. It is a further object to provide a novel synthesis characterized by its simplicity and ability to produce high yields of high purity product. Other objects of the invention will be apparent to those skilled in the art on inspection of the following description.

The novel process of this invention provides a total synthesis of diorganotin derivatives of mercaptoacids, starting from simple and inexpensive raw materials. It is a particular feature of this invention that it eliminates the necessity for purifying the mercaptoacid reactant without impairing the purity of the desired final product.

In accordance with certain of its aspects, the process of this invention for preparing diorganotin S,O-mercaptocarboxylate comprises reacting a diorganotin oxide of the formula R′$_2$SnO, wherein R′ is saturated hydrocarbon, with a mixture containing a mercaptocarboxylic acid, HSCR$_2$(CR$_2$)$_n$COOH, and a thio bis carboxylic acid, S[CR$_2$)$_n$COOH]$_2$, wherein $n$ is 0–2 and R is selected from the group consisting of hydrogen and saturated hydrocarbon, said mercaptocarboxylic acid being present in at least one mole per mole of diorganotin oxide thereby forming diorganotin mercaptocarboxylate and water, and recovering said diorganotin mercaptocarboxylate substantially free of thio bis carboxylic acid.

This invention provides a novel process for preparing diorganotin S,O-mercaptocarboxylates, i.e. compounds which may be represented by the formula

[—R′$_2$SnSCR$_2$(CR$_2$)$_n$COO—]

wherein R′ and R are as described above. When $n$ is 0, the compound may be a diorganotin S,O-$\alpha$-mercaptocarboxylate; when $n$ is 1, it may be a diorganotin S,O-$\beta$-mercaptocarboxylate; and when $n$ is 2, it may be a diorganotin S,O-$\gamma$-mercaptocarboxylate. Preferably, the products of this invention may be diorganotin S,O-$\beta$-mercaptocarboxylates. Typically, these compounds may exist in a ring structure which may be monomeric, dimeric, trimeric, or of higher order. Linear structures may also be present. For convenience of reference, these compounds may be designated by the monomeric, cyclic structure

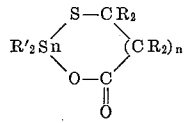

but it will be understood that the term "diorganotin S,O-mercaptocarboxylate" includes all of the possible structures and mixtures thereof.

The diorganotin oxide which may be employed in the practice of this invention may typically have the formula R′$_2$SnO wherein R′ may be saturated hydrocarbon. Saturated hydrocarbons are hydrocarbons which are free of non-aromatic unsaturation. Typically, R′ may be a hydrocarbon radical selected from the group consisting of alkyl, cycloalkyl, aralkyl, aryl, alkaryl, including such radicals when inertly substituted. When R′ is alkyl, it may typically be straight chain alkyl or branched alkyl, including methyl, ethyl, n-propyl, isopropyl, n-butyl, isobutyl, sec.-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. alkyl having less than about 9 carbon atoms, i.e. octyls and lower. When R′ is cycloalkyl, it may typically be cyclopentyl, cyclohexyl, cycloheptyl, cyclooctyl, etc. When R′ is aralkyl, it may typically be benzyl, $\beta$-phenylethyl, $\gamma$-phenylpropyl, $\beta$-phenylpropyl, etc. When R′ is aryl, it may typically be phenyl, naphthyl, etc. When R′ is alkaryl, it may typically be tolyl, xylyl, p-ethylphenyl, p-nonylphenyl, etc. R′ may be inertly substituted e.g. may bear a non-reactive substituent such as alkyl, aryl, cycloalkyl, aralkyl, alkaryl, ether, halogen, nitro, ester, etc. Typical substituted alkyls include 3-chloropropyl, 2-ethoxyethyl, carboethoxymethyl, etc. Substituted cycloalkyls include 4-methyl-cyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

In accordance with the above, the diorganotin oxide may typically be dimethyltin oxide, diethyltin oxide, di-n-propyltin oxide, di-isopropyltin oxide, di-n-butyltin oxide, di-sec-butyltin oxide, diamyltin oxide, dihexyltin oxide, dioctyltin oxide, didodecyltin oxide, dicyclohexyltin oxide, dibenzyltin oxide, diphenyltin oxide, di-p-tolyltin oxide, etc. The preferred diorganotin oxides are the dialkyltin oxides wherein R′ is lower alkyl, and the most preferred diorganotin oxides may be dibutyltin oxide and dioctyltin oxide.

In accordance with the process of this invention, the diorganotin oxide may be reacted with a mixture containing a mercaptocarboxylic acid, HSCR$_2$(CR$_2$)$_n$COOH, and a thio bis carboxylic acid, S[CR$_2$(CR$_2$)$_n$COOH]$_2$, wherein R is selected from the group consisting of hydrogen and saturated hydrocarbon. When R is hydrocarbon it may typically be selected from the same group as R′. It will be understood that the R groups may be joined to form an aromatic or non-aromatic cyclic structure. All of the R groups need not be the same. Preferably, R may be hydrogen.

Typical $\alpha$-mercaptocarboxylic acids which may be employed include $\alpha$-mercaptoacetic acid; $\alpha$-mercaptopropionic acid; $\alpha$-mercaptobutyric acid; $\alpha$-mercaptovaleric acid; $\alpha$-mercaptocaproic acid; $\alpha$-mercaptocaprylic acid; $\alpha$-mercaptolauric acid; $\alpha$-methyl-$\alpha$-mercaptopropionic acid; $\alpha$-methyl-$\alpha$-mercaptobutyric acid; $\alpha$-mercapto-$\alpha$-toluic acid; $\alpha$-mercaptocyclohexanoic acid; etc.

The corresponding $\alpha,\alpha'$-thio bis carboxylic acids include $\alpha,\alpha'$-thio bis(acetic acid); $\alpha,\alpha'$-thio bis(propionic acid); $\alpha,\alpha'$thio bis(butyric acid); $\alpha,\alpha'$-thio bis(valeric acid);

α,α′-thio bis(caproic acid); α,α′-thio bis(caprylic acid); α,α′-thio bis(lauric acid); α,α′-thio bis(α-methylpropionic acid); α,α′-thio bis(α-methylbutyric acid); α,α′-thio bis(α-toluic acid); α,α′-thio bis(cyclohexanoic acid); etc.

Typical β-mercaptocarboxylic acids which may be employed include β-mercaptopropionic acid; β-mercaptobutyric acid; β-mercaptovaleric acid; β-mercaptocaproic acid; β-mercaptocaprylic acid; β-mercaptolauric acid; α-methyl-β-mercaptopropionic acid; β-methyl-β-mercaptobutyric acid; β-mercaptocyclohexanoic acid; etc.

The corresponding β,β′-thio bis carboxylic acids include β,β′-thio bis(propionic acid); β,β′-thio bis(butyric acid); β,β′-thio bis(valeric acid); β,β′-thio bis(caproic acid); β,β′-thio bis(caprylic acid; β,β′-thio bis(lauric acid); β,β′-thio bis(α-methylpropionic acid); β,β′-thio bis(β-methylbutyric acid); β,β′-thio bis(cyclohexanoic acid); etc.

Typical γ-mercaptocarboxylic acids which may be employed include γ-mercaptobutyric acid; γ-mercaptovaleric acid; γ-mercaptocaproic acid; γ-mercaptocaprylic acid; γ-mercaptolauric acid; α-methyl-γ-mercaptovaleric acid; β-methyl-γ-mercaptobutyric acid; o-mercapto-α-toluic acid; γ-mercaptocyclohexanoic acid; etc.

The corresponding γ,γ′-thio bis carboxylic acids include γ,γ′-thio bis(butyric acid; γ,γ′-thio bis(valeric acid); γ,γ′-thio bis(caproic acid); γ,γ′-thio bis(caprylic acid); γ,γ′-thio bis(lauric acid); γ,γ′-thio bis(α-methylvaleric acid); γ,γ′-thio bis(β-methylbutyric acid); o,o′-thio bis(α-toluic acid); γ,γ′-thio bis(cyclohexanoic acid); etc.

The preferred mixture may be a mixture of β-mercaptopropionic acid and β,β′-thio bis(propionic acid).

The mixtures of mercaptocarboxylic acids with thio bis carboxylic acids may readily be prepared, for example by reacting a lactone of the formula

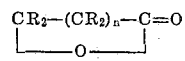

with a water-soluble inorganic sulfide in a polar solvent, preferably water. Other equivalent techniques may be employed, such as the reaction of halocarboxylic acids, typically chlorocarboxylic acids of the structure

with an inorganic sulfide in a polar solvent such as water.

The preferred mixtures of a β-mercaptocarboxylic acid with a β,β′-thio bis carboxylic acid may, for example, be conveniently and readily prepared by the reaction of an aliphatic β-lactone with a water-soluble inorganic sulfide as disclosed in U.S. Patent 2,449,989, patented Sept. 28, 1948. Typically, the desired mixture of β-mercaptocarboxylic acid and β,β′-thio bis carboxylic acid may be prepared by reacting a β-lactone of the formula

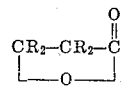

wherein R has the meaning hereinbefore set forth, with a water-soluble inorganic sulfide in the presence of a polar solvent. The inorganic sulfide employed may include hydrogen sulfide, ammonium sulfide, ammonium hydrosulfide, alkali metal sulfide, alkali metal hydrosulfide, etc. The hydrosulfides may be employed as such or may be formed in situ by bubbling hydrogen sulfide into an aqueous or alcoholic solution of an ammonium or alkali metal hydroxide or sulfide. The preferred inorganic sulfide may be an alkali metal hydrosulfide, e.g. sodium hydrosulfide. Preferably, the polar solvent may be water or alcohol, e.g. ethanol, and most preferably it may be water.

Preferably, the β-lactone may be added to a solution of the inorganic sulfide and the reaction mixture so formed may be maintained below about 30° C. and preferably 0° C.–20° C., say 10° C. during the addition. Preferably, the inorganic sulfide may be employed in amount of about 1.0–1.5 moles, say 1.05 moles per mole of β-lactone. When the addition is completed, the reaction mixture may preferably be maintained at 0° C.– 20° C., say 10° C. for an additional 45–120, say 60 minutes to ensure maximum yield.

The product obtained by this procedure may typically comprise a mixture of the salts of the β-mercaptocarboxylic acid and the β,β′-thio bis carboxylic acid. These may be converted to the corresponding acids by acidifying the solution, typically to a pH of about 0 to 1.5, say 1.0, with a suitable acid, e.g. hydrochloric acid. The mixture of β-mercaptocarboxylic acid and β,β′-thio bis carboxylic acid may be recovered from the acidified solution by extraction with an organic solvent, preferably an organic ether and most preferably isopropyl ether.

The product mixture of acids obtained may typically contain about 65–90, say 80 parts by weight of mercaptocarboxylic acid and about 10–35, say 20 parts by weight of thio bis carboxylic acid, and the total yield of mixed acid may be about 65–95% of theory.

It is a particular feature of this invention that when these mixtures of mercaptocarboxylic acid and thio bis carboxylic acid are reacted with diorganotin oxide in accordance with this invention, an essentially quantitative yield of the desired diorganotin S,O-mercaptocarboxylate is obtained, and this compound is recovered essentially free of contamination by undesirable materials including the thio bis carboxylic acid or salts thereof.

The reaction of the diorganotin oxide with the mixture of mercaptocarboxylic acid and thio bis carboxylic acid, in accordance with this invention, is effected by mixing the reactants together in amounts such that there is present in the reaction mixture at least one mole of mercapocarboxylic acid per mole of diorganotin oxide. Preferably, the mole ratio of mercaptocarboxylic acid to diorganotin oxide may be about 1.0–1.5:1 and most preferably substantially 1:1, e.g. 1.0–1.05:1, say 1.02:1. The amount of mercaptocarboxylic acid present in the mixture of acids may be readily determined by analyzing for sulfur and acid number. The mercaptocarboxylic acid contains one equivalent of acid per mole of sulfur and the thio bis carboxylic acid contains two equivalents of acid per mole of sulfur. Thus, the composition of the mixture of acids may be calculated from the ratio of acid equivalents to total sulfur; and the quantity of acid mixture required to give the desired amount of mercaptocarboxylic acid may be determined. Alternatively, the acid mixture may be analyzed for mercapto sulfur, and the amount of mercaptocarboxylic acid present may thereby be directly determined.

The diorganotin oxide may be reacted with the acid mixture by mixing them together, preferably in the presence of an inert solvent. Preferred solvents are inert organic solvents, including hydrocarbons such as benzene, toluene, xylene, n-hexane; organic ethers such as ethyl ether, butyl ether, isopropyl ether; ketones such as acetone, methyl ethyl ketone; etc. Organic ethers may be preferred and isopropyl ether may be highly preferred. Preferably, the inert solvent may be the solvent employed in the extraction of the mixture of acids. The inert solvent may be used in amount sufficient to give workable viscosity and good heat transfer, typically about 100–500 ml., preferably 140–180, say 160 ml. of solvent per 100 grams of diorganotin oxide.

The reaction of the diorganotin oxide with the mercaptocarboxylic acid produces produce diorganotin S,O-mercaptocarboxylate and by-product water. The reaction may be promoted by removing the water formed from the reaction medium. Typically, this may be accomplished by heating to a temperature high enough to drive off the water as water vapor or in the form of an azeotrope, e.g. about 6–120° C., say 65° C. Other equivalent means for removing water, e.g. drying agents, use of water-immiscible solvents, etc. may also be employed. The reaction may be continued until complete, e.g. until no further water is formed, typically for about 45–120, say 60 minutes.

When the reaction is complete, the reaction product diorganotin S,O-mercaptocarboxylate may precipitate from solution, while substantially all of the thio bis mercaptocarboxylic acid and any excess mercaptocarboxylic acid may be retained in solution. If the reaction is conducted in a solvent in which the diorganotin S,O-mercaptocarboxylate is soluble, the entire reaction mixture may be stripped to dryness, e.g. by means of a rotary film evaporator and thereafter dispersed in a non-solvent for the diorganotin S,O-mercaptocarboxylate, preferably acetone or isopropyl ether.

Recovery of diorganotin mercaptocarboxylate in high purity may be accomplished by filtering it from the solvent and washing with a small quantity of additional solvent. The yield of product may be maximized by cooling to at least as low as about 25° C. prior to filtration. Typically, the yield of desired product may be greater than 95% of theory, based on the diorganotin oxide. In the preferred embodiments, the yield of product may be almost quantitative based on both the diorganotin oxide and the mercaptocarboxylic acid.

Practice of a preferred embodiment of the novel process of this invention may be observed from the following illustrative example.

56 g. of sodium hydrosulfide was dissolved in 200 ml. of water and the resultant solution was cooled to 10° C. 72 g. of β-propiolactone were added to the cooled solution, with agitation, over a period of 60 minutes and the temperature was maintained at 10° C. during the addition. When the addition was complete, the solution was stirred for 60 minutes at 10° C. The solution was then acidified to a pH of less than 1 by the addition of 110 g. of 35% aqueous hydrochloric acid. The acid solution was then countercurrently extracted with 250 gm. of isopropyl ether. The ether extract assayed 6.65% mercaptosulfur and had an acid number of 145, which corresponds to a solution containing 22% by weight β-mercaptopropionic acid and 4.5% by weight β,β'-thio bis(propionic acid). 173 g. of the isopropyl ether solution (0.36 mole of β-mercaptopropionic acid) was mixed with 89.5 g. (0.36 mole) of di-n-butyltin oxide and the mixture was refluxed (65° C.) for 2 hours. The reaction mixture was then cooled to room temperature, and the precipitated di-n-butyltin β-mercaptopropionate was filtered off, washed with methanol, and dried. The yield of product was 115.1 g. (96% of theory). Analysis of the product showed 35.3% Sn (35.2% theory) and 9.6% S (9.5% theory). Accordingly, the product was highly pure di-n-butyltin S.O-β-mercaptopropionate, substantially free from contamination by β,β'-thio bis (propionic acid).

From this illustrative example, it may readily be seen that the process of this invention gives a high yield of high purity product, substantially completely uncontaminated by undesirable impurities.

Although this invention has been illustrated by reference to specific examples, numerous changes and modifications thereof which clearly fall within the scope of the invention will be apparent to those skilled in the art.

I claim:
1. The process for preparing diorganotin S,O-mercaptocarboxylates which comprises reacting a diorganotin oxide of the formula R'₂SnO, wherein R' is a saturated hydrocarbon, with a mixture containing a mercaptocarboxylic acid; HSCR₂(CR₂)ₙCOOH, and a thio bis carboxylic acid, S[CR₂(CR₂)ₙCOOH]₂, wherein n is 0–2 and R is selected from the group consisting of hydrogen and saturated hydrocarbon, said mercaptocarboxylic acid being present in at least one mole per mole of diorganotin oxide thereby forming diorganotin mercaptocarboxylate and water, and recovering said diorganotin mercaptocarboxylate substantially free of thio bis carboxylic acid.

2. The process of claim 1 wherein $n$ is 1.
3. The process of claim 1 wherein R is hydrogen.
4. The process of claim 1 wherein R' is lower alkyl.
5. The process of claim 1 wherein said mercaptocarboxylic acid is present in the amount of substantially one mole per mole of diorganotin oxide.
6. The process for preparing diorganotin S,O-β-mercaptocarboxylates which comprises reacting a diorganotin oxide of the formula R'₂SnO wherein R' is lower alkyl, with a mixture containing a β-mercaptocarboxylic acid, HSCR₂CR₂COOH, and a β,β'-thio bis carboxylic acid, S(CR₂CR₂COOH)₂ wherein R is selected from the group consisting of hydrogen and saturated hydrocarbon, said β-mercaptocarboxylic acid being present in at least one mole per mole of diorganotin oxide thereby forming diorganotin β-mercaptocarboxylate and water, and recovering said diorganotin β-mercaptocarboxylate substantially free of β,β'-thio bis carboxylic acid.
7. The process of claim 6 wherein R is hydrogen.
8. The process of claim 6 wherein said reaction is carried out in the presence of an inert solvent.
9. The process of claim 6 wherein said reaction is carried out in the presence of an organic ether as inert solvent.
10. The process of claim 6 wherein said reaction is carried out in the presence of isopropyl ether as inert solvent.
11. The process for preparing diorganotin S,O-β-mercaptocarboxylates which comprises reacting together an aliphatic β-lactone of the formula

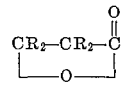

wherein R is selected from the group consisting of hydrogen and saturated hydrocarbon with a water-soluble inorganic sulfide in the presence of a polar solvent thereby forming a mixture containing a β-mercaptocarboxylic acid, HSCR₂CR₂COOH, and β,β'-thio bis carboxylic acid S(CR₂CR₂COOH)₂, and reacting with said mixture a diorganotin oxide of the formula R'₂SnO, wherein R' is saturated hydrocarbon, said β-mercaptocarboxylic acid being present in at least one mole per mole of diorganotin oxide thereby forming diorganotin β-mercaptocarboxylate and water, and recovering said diorganotin β-mercaptocarboxylate substantially free of β,β'-thio bis carboxylic acid.
12. The process of claim 11 wherein R is hydrogen.
13. The process of claim 11 wherein R' is lower alkyl.
14. The process of claim 11 wherein said mixture is extracted from said polar solvent with an organic ether prior to said reaction with said diorganotin oxide.

References Cited
UNITED STATES PATENTS

| | | | |
|---|---|---|---|
| 2,789,963 | 4/1957 | Hecker | 260—429.7 X |
| 2,832,750 | 4/1958 | Weinberg et al. | 260—429.7 X |
| 2,832,752 | 4/1958 | Weinberg et al. | 260—429.7 X |

TOBIAS E. LEVOW, *Primary Examiner.*
W. F. W. BELLAMY, *Assistant Examiner.*